(12) United States Patent
Gretz

(10) Patent No.: US 7,021,591 B1
(45) Date of Patent: *Apr. 4, 2006

(54) CABLE SUPPORT AND METHOD

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/061,025

(22) Filed: Feb. 18, 2005

Related U.S. Application Data

(63) Continuation of application No. 10/617,941, filed on Jul. 11, 2003, now Pat. No. 6,857,606.

(51) Int. Cl.
*F16L 3/22* (2006.01)

(52) U.S. Cl. ..................... 248/68.1; 248/74.3
(58) Field of Classification Search ............. 248/68.1
See application file for complete search history.

(56) References Cited

U.S. PATENT DOCUMENTS

| | | | | |
|---|---|---|---|---|
| 1,472,955 A | * | 11/1923 | Behringer | 248/68.1 |
| 2,746,110 A | * | 5/1956 | Bedford, Jr. | 211/26.2 |
| 3,347,505 A | * | 10/1967 | Menser | 248/68.1 |
| 3,599,912 A | * | 8/1971 | Stephens | 248/58 |
| 3,890,459 A | * | 6/1975 | Caveney | 174/101 |
| 4,098,326 A | * | 7/1978 | Waters | 165/76 |
| 4,210,202 A | * | 7/1980 | Boyer et al. | 165/162 |
| 4,493,468 A | * | 1/1985 | Roach | 248/62 |
| 4,709,888 A | * | 12/1987 | Cubit et al. | 248/73 |
| 4,813,639 A | * | 3/1989 | Midkiff et al. | 248/68.1 |
| 6,318,680 B1 | * | 11/2001 | Benedict et al. | 248/49 |
| 2001/0052563 A1 | * | 12/2001 | Bellanger | 248/68.1 |
| 2004/0113024 A1 | * | 6/2004 | Caveney et al. | 248/49 |

* cited by examiner

*Primary Examiner*—Anita M. King

(57) ABSTRACT

A cable support and method for securing a plurality of cables to the structure of a building in such a manner that they are maintained parallel and separate from one another. The one-piece cable support includes a base with an attachment arrangement for anchoring to a surface and a plurality of first and second holding members. Each first holding member includes an arcuate cable holder, a slot, and a deformable member thereon. Each second holding member includes a cable rest thereon. The first and second holding members are paired in sets. The base is secured to a building structure and a cable laid within each set of holding members. A leverage tool is inserted within each slot and leverage applied to deform the deformable member until it contacts the inserted cable. The sets of holding members are aligned parallel to one another thereby providing a cable installation in which each of the inserted cables are securely held separate and parallel to one another.

3 Claims, 6 Drawing Sheets

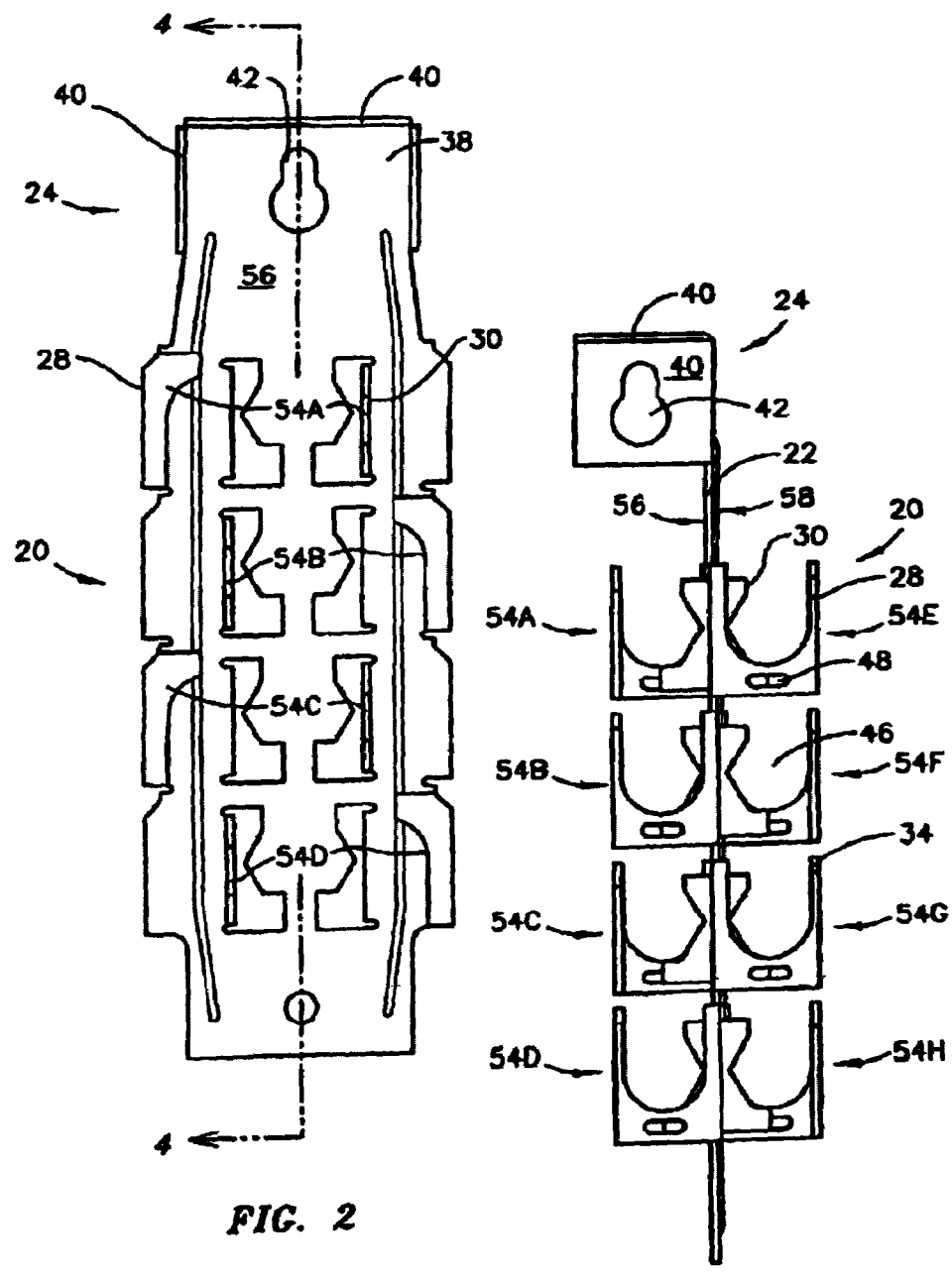

CABLE SUPPORT AND METHOD

This application is a continuation of U.S. patent application Ser. No. 10/617,941, filed on Jul. 11, 2003 now U.S. Pat. No. 6,857,606, entitled "Cable Support and Method".

FIELD OF THE INVENTION

The present invention relates to cable supports and more specifically to cable supports for supporting and maintaining separation between a plurality of cables.

BACKGROUND OF THE INVENTION

In order to provide electricity, communications, or data transfer lines in buildings or factories, installers must frequently install a large quantity of cables and route them throughout the structure. In the past, it was accepted practice to route large bundles of cables with the individual cables gathered together and in contact with many adjacent cables. For many cables, such as those containing conductors for transmitting data, it is important to maintain separation between cables to prevent unwanted interference between the adjacent cables, which may be caused by the magnetic fields produced by the individual conductors.

One device for maintaining separation between cables is the wire support bracket disclosed in U.S. Pat. No. 5,615,850. The bracket includes holes through which wire is threaded and reinforced mounting flanges on three axes of the bracket to provide flexibility in mounting on different construction members. Although the bracket provides a device for maintaining separation between wires, its construction requires that the wires be threaded through the holes. This complicates the task of installing wire in a large area, as each wire must be threaded through each separate hole.

U.S. Pat. No. 4,244,542 (hereinafter the '542 patent) disclosed a conduit spacer system including a U-shaped member having a base and an open end for receiving a conduit. The U-shaped member is molded in one piece from plastic and includes matching interlocking means attached to opposite sides thereof to allow adjacent units to be interconnected to support multiple conduits with a desired horizontal spacing. Although the '542 patent provides a device for providing separation between conduits, it has the disadvantage of requiring assemblage of several separate U-shaped members. This adds time to the installation task. Unfortunately, the U-shaped members do not provide a positive locking feature to hold the inserted conduits within the arms of the U-shaped member. Additionally, the U-shaped members are of a set size, and for a proper fit can handle only one size of conduit.

U.S. Pat. No. 5,992,802 (hereinafter the '802 patent) discloses a cable support for parallel runs of coaxial cable that includes pairs of molded blocks stacked on a single threaded rod. The blocks of each pair are identical and include semi-circular cylindrical recesses that fit together to provide circular passageways for cable. Although the '802 patent provides a device for providing separation between cables, it has the disadvantage of being of a complex design, requiring a threaded rod and multiple blocks to enclose the cables. Having no means to reduce or enlarge the diameter of the passageways, it also is ideal for only one size of cable. A cable of smaller diameter than the passageway would not be anchored tightly in the passageway. A cable of larger diameter than the passageway would force open the blocks, and not allow them to close properly.

OBJECTS AND ADVANTAGES

As described above, prior art cable supports have not proven ideal for maintaining separation between cables. Accordingly, the present invention addresses some of the shortcomings of the prior art cable supports.

The cable support of the present invention therefore has the advantage of allowing insertion of cables from the side, thereby eliminating the need to thread cables individually through the support. This minimizes the time required to install the cables.

The cable support of the present invention has the advantage of one-piece construction. It therefore does not require the assemblage at the job site of several separate members, as do many prior art cable supports.

Additionally the cable support of the present invention includes deformable members that allow an installer to lock cables securely within the support so that the cables are permanently secured without any possibility of them slipping or falling out.

The cable support of the present invention also has the advantage of being able to accept a wide variety of cable diameters therein. The deformable members can be deformed an appropriate amount to securely lock cables of a variety of diameters therein according to the installer's preference.

The cable support described herein has the advantage of easy attachment to a variety of structures in a building to provide long term installation of cables wherein each of the cables are maintained parallel to and separate from one another.

These, and other advantages will be apparent to a person skilled in the art by reading of the attached description along with reference to the attached drawings.

SUMMARY OF THE INVENTION

According to the present invention, there is provided a cable support and method for securing a plurality of cables to the structure of a building and maintaining them parallel and separate from one another. The cable support is of one-piece construction and includes a base with an attachment arrangement for anchoring to a surface and a plurality of first and second holding members. Each first holding member includes an arcuate cable holder, a slot, and a deformable member thereon. Each second holding member includes a cable rest thereon. The first and second holding members are paired in sets. The base is secured to a building structure and a cable inserted within each set of holding members. A leverage tool is inserted within each slot and leverage applied to deform the deformable member until it contacts the inserted cable. The sets of holding members are aligned parallel to one another thereby providing a cable installation in which each of the inserted cables are securely held separate and parallel to one another.

DESCRIPTION OF THE DRAWINGS

FIG. 2 is a front view of the blank of FIG. 1 after bending.

FIG. 3 is a side view of the blank of FIG. 1 after being formed into a cable support according to the present invention.

TABLE OF NOMENCLATURE

Figure 1:
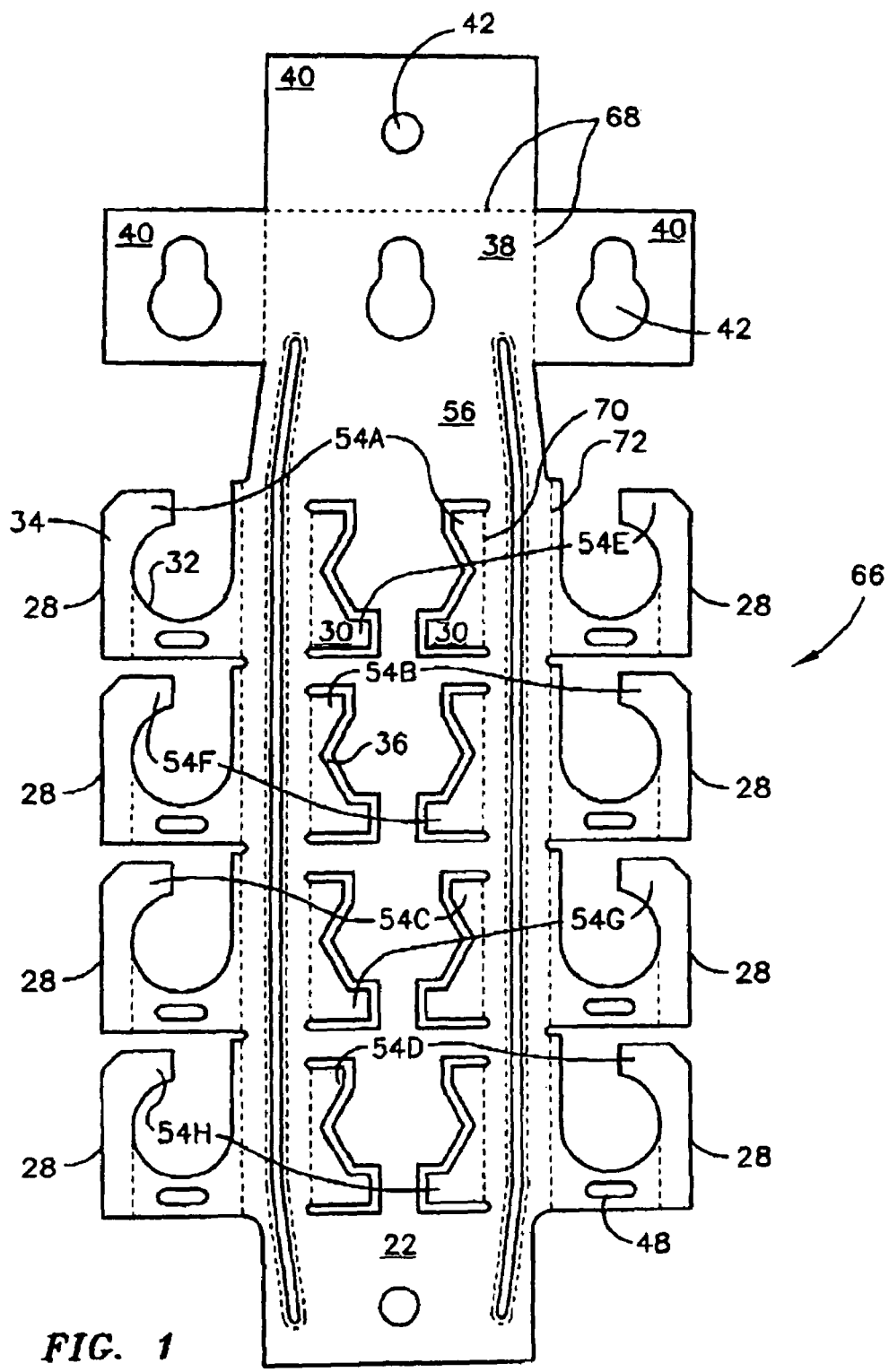
FIG. 1 is a plan view of a blank that will be formed into a preferred embodiment of a cable support according to the present invention.

The following is a listing of part numbers used in the drawings along with a brief description:

| Part Number | Description |
| --- | --- |
| 20 | first embodiment of the cable support (8-cable version) |
| 22 | base |
| 24 | attachment arrangement |
| 26 | surface |
| 28 | first holding member |
| 30 | second holding member |
| 32 | arcuate cable holder |
| 34 | deformable member |
| 36 | cable rest |
| 38 | head |
| 40 | ear |
| 42 | apertures in head |
| 46 | channel |
| 48 | slot |
| 50 | V-shaped end |
| 52 | tab |
| 54a–h | sets of holding members in first embodiment |
| 56 | first side of base |
| 58 | second side of base |
| 60 | second embodiment of the cable support (4-cable version) |
| 62a–d | sets of holding members in second embodiment |
| 64 | first side of base |
| 66 | blank |
| 68 | bend line for forming the head |
| 70 | bend line for forming the second holding member |
| 72 | bend line for forming the first holding member |
| 74 | bend line for forming the deformable member |
| 78 | cable |

DETAILED DESCRIPTION

The present invention is a cable support for securing a plurality of electrical cables to a surface. A cable support according to the present invention is especially useful for routing several cables throughout a building. Several cable supports according to the present invention can be secured along a proposed path for electrical cables. The cables can then be routed to and secured to each cable support. After being secured thereto, the support holds and maintains separation between the separate cables.

Figure 6:
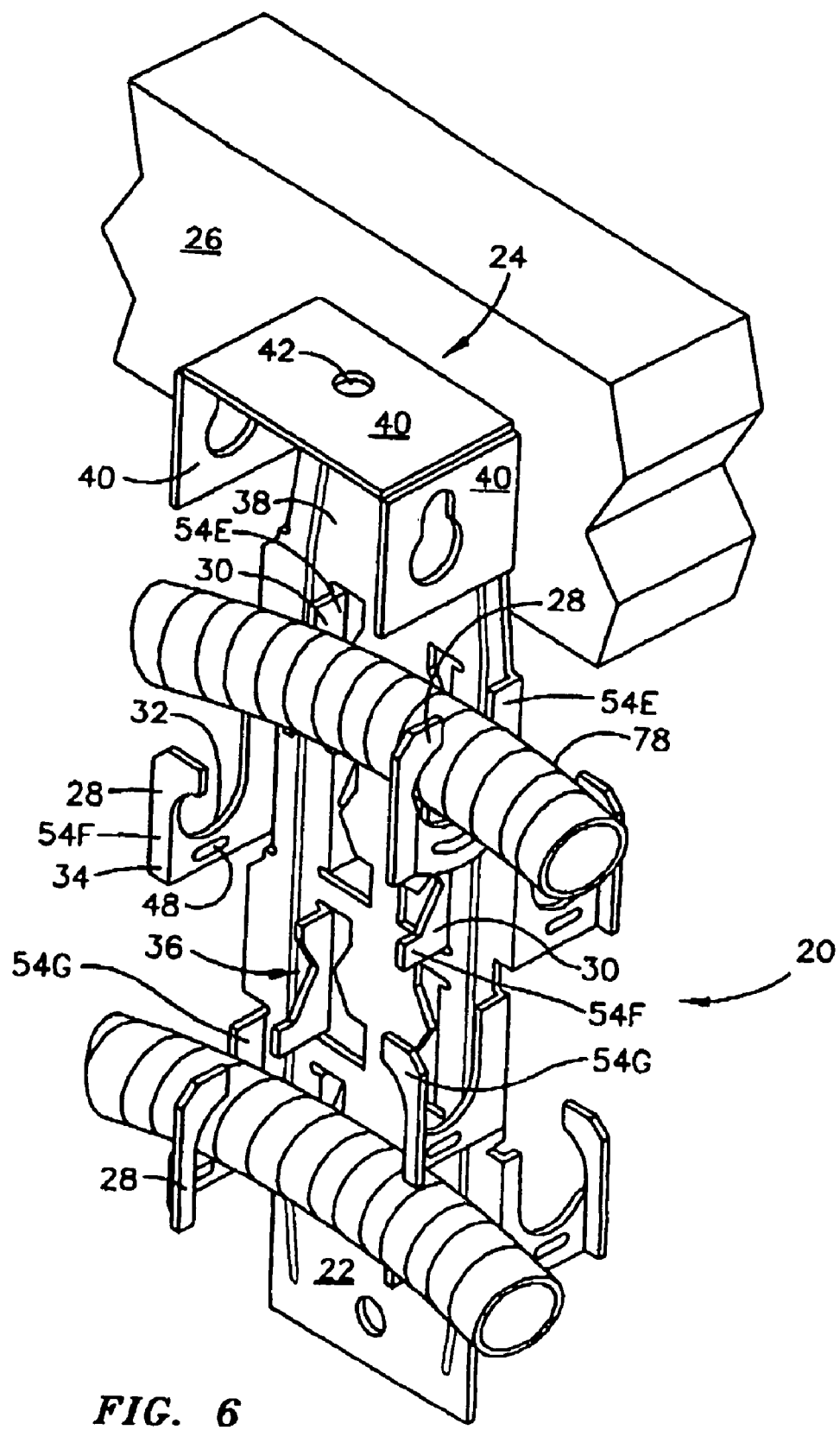
FIG. 6 is a perspective view of the cable support of FIG. 3 with cables inserted therein.

Referring to FIG. 6 there is shown a preferred embodiment of a cable support 20 according to the present invention. The preferred embodiment is capable of securing 8 cables to a surface and holding them separate and in a parallel orientation to one another. The cable support 20 includes a base 22, an attachment arrangement 24 for anchoring to a surface 26, a first holding member 28 integral with and extending from the base 22, and a second holding member 30 integral with and extending from the base 22. The first holding member 28 includes an arcuate cable holder 32 having a deformable member 34 thereon. A cable rest 36 is included on the second holding member 30.

The attachment arrangement 24 includes a head 38 integral with and extending from the base 22. The head 38 is typically rectangular and extends in the same plane as the base 22. Three ears 40 extend away from a plane containing the base 22 at a 90 degree angle from each side of the head 38 and typically contain one or more apertures 42 therein. Fasteners (not shown) may be driven through one or more of apertures 42 to secure the cable support 20 to a surface.

The first holding member 28 typically extends at a 90 degree angle from the base 22 and includes a deformable member 34 extending at an angle of 90 degrees from the first holding member 28. The arcuate cable holder 32 is an open area in the first holding member 28 that includes between 260 and 280 degrees of arc of a full circle. The deformable member 34 extends from the first holding member 28 at a point between 155 and 165 degrees of said arc away from the base 22.

As shown in FIG. 3, with the first holding member 28 extending at a 90 degree angle from the base 22, and the deformable member 34 extending at an angle of 90 degrees from the first holding member 28, a channel 46 is thereby formed between the deformable member 34 and the base 22. A slot 48 is included in the first holding member 28 as shown.

The main concerns in constructing the cable support of the present invention is that it be strong enough to support the weight of several cables and that it be flexible enough to allow bending of the deformable member 34. The cable support 20 of the present invention is constructed of steel. Preferably the cable support 20 is constructed from sheet steel that is between 14 and 20 gage and even more preferably is constructed of 16-gage steel.

Figures 4, 5:
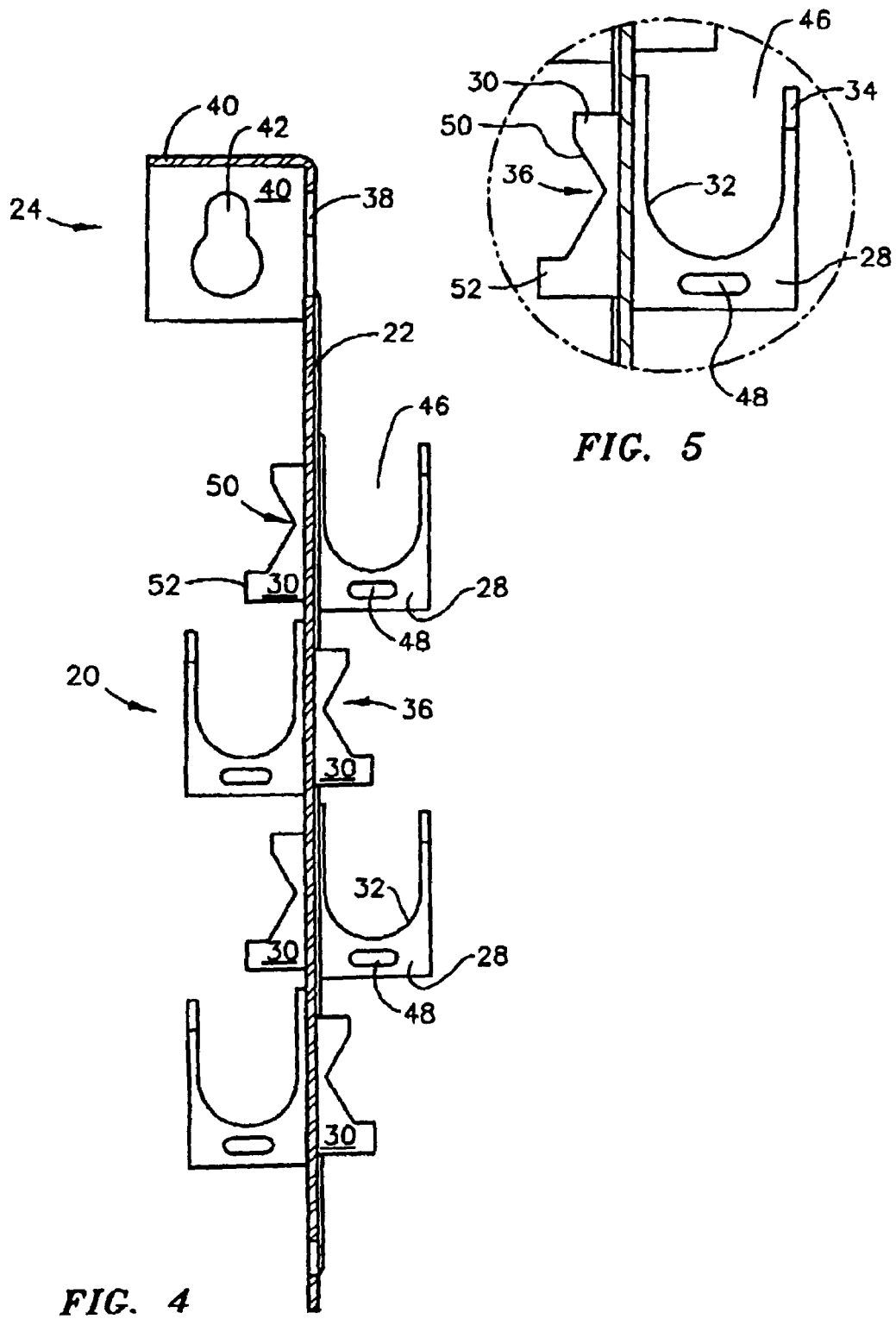
FIG. 4 is a sectional view taken along line 4—4 of FIG. 2.
FIG. 5 is a detailed view of one set of holding members of FIG. 3.

Referring to FIG. 5, the second holding member 30 extends at 90 degrees from the base 22 and includes a V-shaped end 50. A tab 52 extends from one side of the V-shaped end 50 to create the cable rest 36 of the second holding member 30.

Referring to FIGS. 1 and 3, the first 28 and second 30 holding members constitute a first set 54a of holding members. The cable support 20 includes a plurality of additional sets 54b, 54c, 54d, 54e, 54f, 54g, 54h of first 28 and second 30 holding members extending from the base 22. In the preferred embodiment or 8-cable version of the cable support 20, four sets of holding members project from each side. As a result of each first 28 and second 30 holding member being aligned at the same elevation of the blank, as shown in FIG. 1, any cables across one set of holders will be aligned parallel to the first set 54a of holding members and parallel with respect to each other. As a result, in the first embodiment of a cable support 20 according to the present invention, the sets of holding members are eight in number and four of the sets 54a, 54b, 54c, 54d extend from a first side 56 of the base 22 and four of the sets 54e, 54f, 54g, 54h extend from a second side 58 of the base 22.

Figures 7, 8:
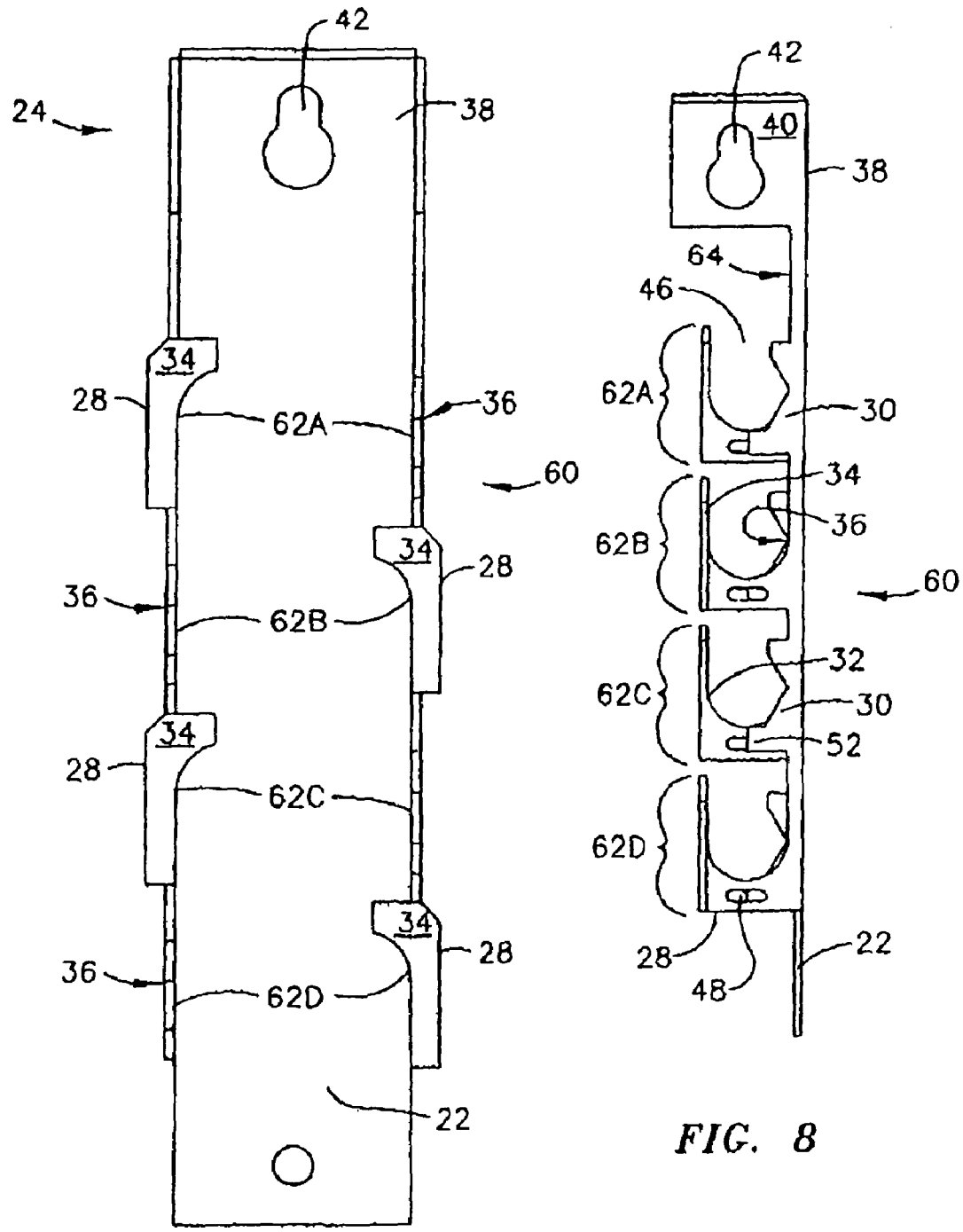
FIG. 7 is a front view of a second embodiment of the cable support.
FIG. 8 is a side view of the cable support of FIG. 7.
Figure 9:
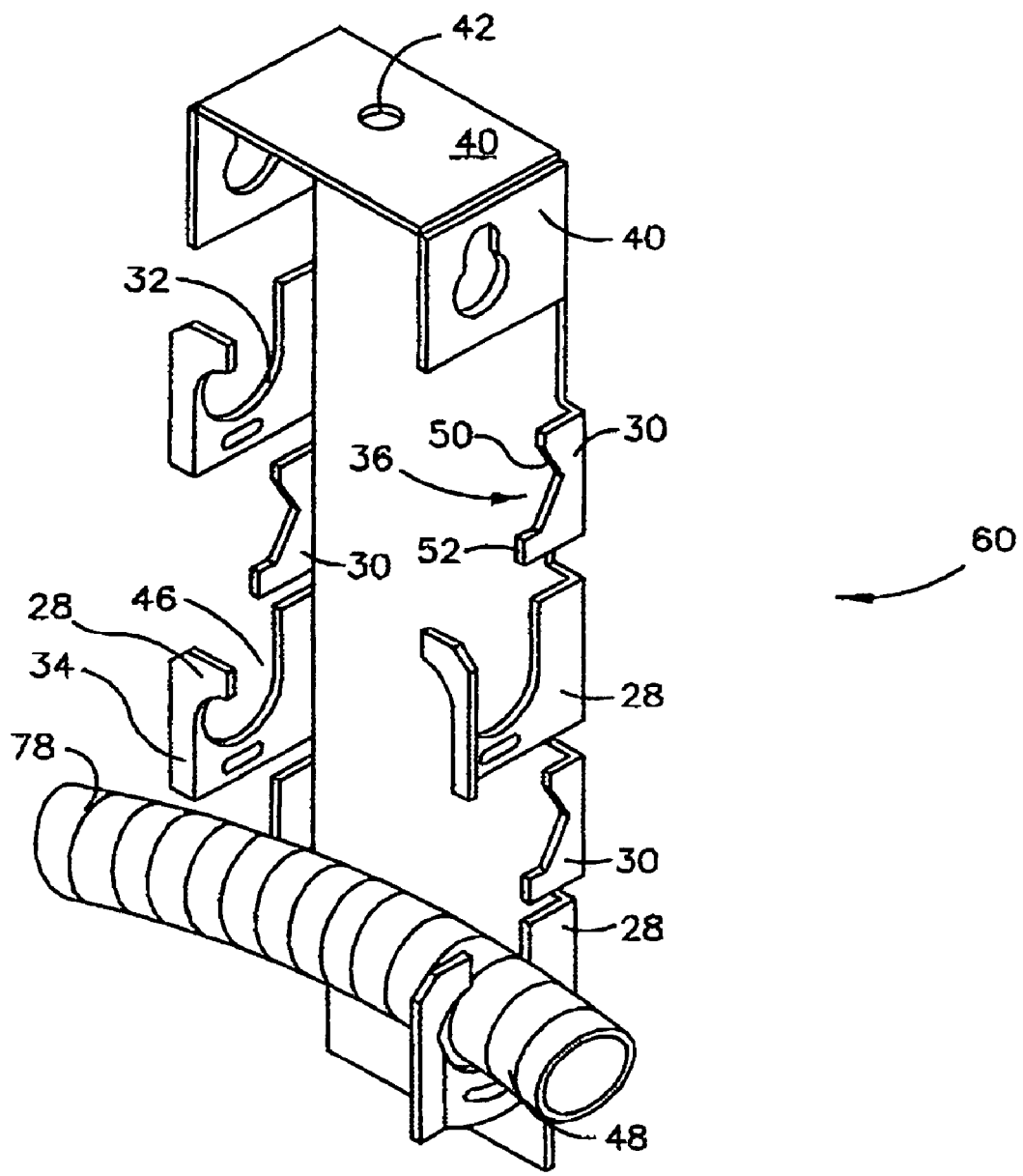
FIG. 9 is a perspective view of the cable support of FIG. 7 with cables inserted therein.

A second embodiment of a cable support 60 according to the present invention is depicted in FIGS. 7 and 8 and includes four sets 62a, 62b, 62c, 62d of holding members with all four sets extending from a first side 64 of the base 22.

Referring to FIG. 1, the cable support 20 of the present invention is typically formed from a blank 66 in a stamping operation. The various features are formed by stamping out portions of the blank 66 including apertures 42 in the head 38 and ears 40, and the details of the first holding members 28 including the arcuate cable holder 32, the deformable member 34, and the slots 48, and the details of the second holding members 30 including the V-shaped ends 50, the tabs 52, and the cable rests 36. The bend lines are shown in broken lines on FIG. 1 and include the bend lines 68 for forming the head 38, the bend lines 70 for forming the second holding members 30, the bend lines 72 for forming the first holding members 28, and the bend lines 74 for forming the deformable members 34.

Referring to FIG. 6, the cable support 20 is placed in operation by first securing the base 22 to a surface 26 by driving a fastener (not shown) through the head 38. A cable 78 is then positioned in the first set 54a of cable holders by placing it within the arcuate cable holder 32 on the first holding member 28 and against the cable rest 36 of the second holding member 30. A screwdriver or similar leverage tool (not shown) is then inserted into the slot 48 in the first holding member 28. Pressure is then exerted on the first holding member 28 until the deformable member 34 secures the cable 78 against the base 22. Exerting pressure on the slot 48 causes the first holding member 28 to buckle or bend in the vicinity of the slot 48 and thereby collapse the channel 46. The deformable member 34, being integral with the base 22 and constructed of steel, deforms against the cable 78 and secures it against the base 22. The screwdriver is then removed from the slot 48 and the deformable member 34 retains its deformed shape, thereby trapping the cable 78 against the base 22. This procedure is then repeated, of laying a cable within each set of holding members, inserting a screwdriver in each slot, and bending each deformable member until the cable therein is locked within the set of cable holders.

Although the disclosure herein describes two embodiments of a one-piece cable support, one for securing four cables and one for securing eight cables, it should be understood that the concepts presented herein could easily be varied to provide cable supports for any desired number of cables.

As the invention has been described, it will be apparent to those skilled in the art that the same may be varied in many ways without departing from the spirit and scope of the invention. Any and all such modifications are intended to be included within the scope of the appended claims.

What is claimed is:

1. A blank for forming into a cable support comprising:
   said blank capable of being deformed;
   said blank having two ends;
   a head region extending from a first of said ends of said blank;
   apertures in said head region;
   ears in said head region capable of being bent forward;
   a first holding member region along a side of said blank capable of being bent forward from said blank;
   a second holding member region in said blank adjacent said first holding member region;
   a cable holder region in said first holding member region;
   a deformable member region adjacent said cable holder region, said deformable member region capable of being manually deformed for holding a cable; and
   a cable rest region in said second holding member capable of being bent forward from said blank and permitting said cable to rest thereon whereby said blank can be made into said cable support.

2. A cable support comprising:
   a rigid base;
   an attachment arrangement on said rigid base for anchoring to a surface;
   a first holding member extending from said base;
   a cable holder on said first holding member;
   a manually deformable member on said first holding member;
   a second holding member extending from said base; and
   a shaped cable rest on said second holding member;
   wherein a cable may be placed on said rest and said deformable member manually deformed toward said base to secure said cable to said support.

3. A method of supporting cables including the steps of:
   providing a base;
   providing an attachment arrangement on said base for anchoring to a surface;
   providing a first holding member extending from said base;
   providing a cable holder on said first holding member;
   providing a deformable member on said first holding member;
   providing a second holding member extending from said base, said first and second holding members comprising a first set of holding members;
   providing a cable rest on said second holding member;
   securing said base to a surface;
   placing a cable within said cable holder on said first holding member and against said cable rest on said second holding member;
   bending said first holding member until said deformable member secures said cable against said base;
   providing one or more additional sets of holding members extending from said base and arranged parallel to said first set of holding members, each set of holding members including at least one deformable member;
   placing additional cables within said additional sets of holding members; and
   bending each of said deformable members to secure each of said additional cables against said base and thereby forming a set of cables parallel to one another and secured to said surface.

\* \* \* \* \*